Jan. 17, 1961
R. A. MORRIS ET AL
2,968,730
METHOD AND APPARATUS FOR DETECTING MINUTE
CONCENTRATIONS OF GASES AND VAPORS
Filed Dec. 5, 1957
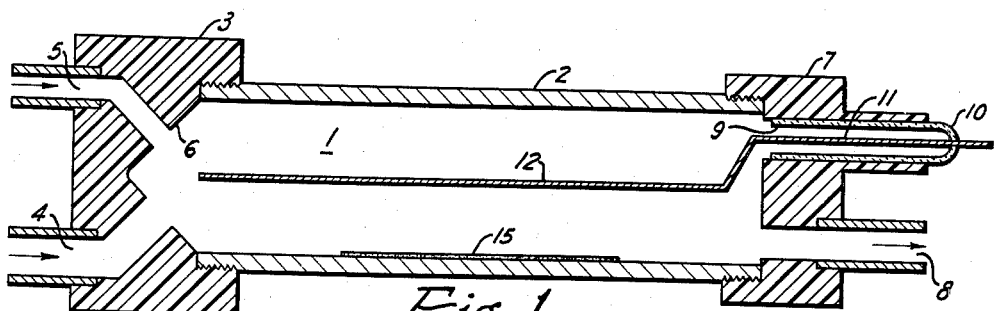
Fig. 1
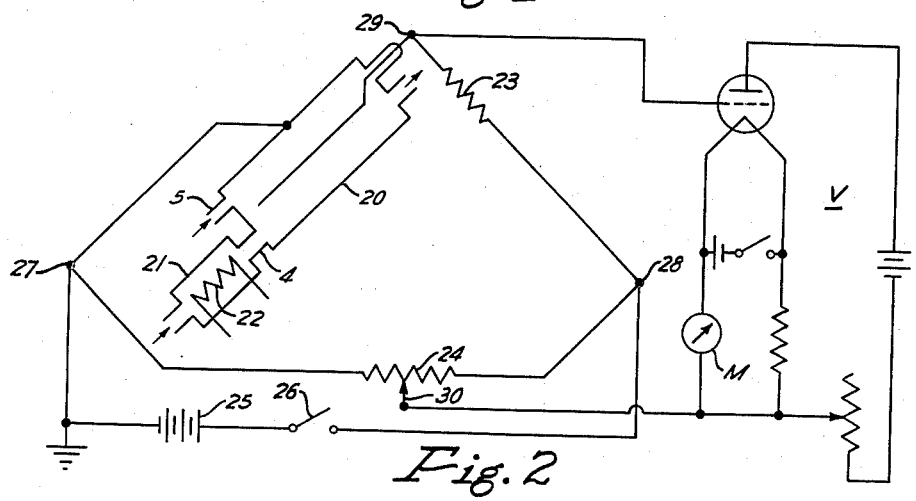
Fig. 2
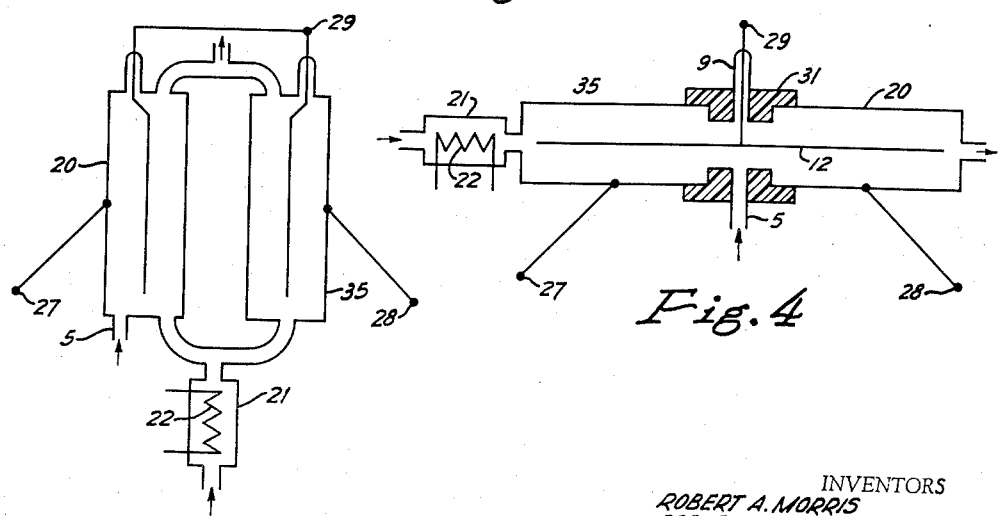
Fig. 3
Fig. 4
INVENTORS
ROBERT A. MORRIS
ROBERT VON HEINE-GELDERN
BY
Brown, Critchlow, Flick & Peckham
ATTORNEYS

United States Patent Office 2,968,730
Patented Jan. 17, 1961

2,968,730

METHOD AND APPARATUS FOR DETECTING MINUTE CONCENTRATIONS OF GASES AND VAPORS

Robert A. Morris, Forest Hills, Pa., and Robert von Heine-Geldern, Upper Montclair, N.J., assignors to Mine Safety Appliances Company of Pittsburgh, Pittsburgh, Pa., a corporation of Pennsylvania Filed Dec. 5, 1957, Ser. No. 700,844

15 Claims. (Cl. 250—83.6)

This invention relates to, and has for its primary object the provision of, a method and apparatus for detecting and identifying minute concentrations of gases and vapors in air and in other gases and gaseous mixtures by use of an ionization chamber.

It is known that passing an ionized gas between two spaced and oppositely charged electrodes causes a current to flow between those electrodes and that the magnitude of this ionization current depends primarily on the ionizing source, the applied electrical field, and the composition and pressure of the gas. If the other factors were held constant, it should be possible, at least in theory, to determine the presence of and to identify a contaminant added to the gas by measuring the resulting change in the ionization current. This conclusion is based on the theory that different gases have individual ionization characteristics. Among these characteristics are the excitation and ionization potential of the gas, the mobility of the resulting ions, and the ion recombination rate. Ion mobility, K, is defined by the equation $v=KE$, where $v$ is the drift velocity (in cm./sec.) imparted to the ions by the electrical field $E$ (in volts/cm.). The recombination coefficient, R, is a quantity that determines the ease with which ions of opposite charge will recombine and neutralize each other. These two quantities, K and R, largely determine the amount of ionization current that will flow in a given ionization chamber at a given applied voltage for a given gas or gaseous mixture. However, these quantities are not independent; they are both very complicated and only partially understood functions of a number of more basic quantities, among which are the masses of the ions involved, their effective radii, their thermal velocity, their mean free path, etc. Direct measurement of those characteristics for the purpose of identifying trace constituents in a gaseous mixture is both impractical and useless when high sensitivity and specificity are required. For example, most gaseous additives to air must be present in concentrations of at least several parts per thousand before producing any measurable change in the ionization current as compared to the current obtained with a sample of pure air, and even then it is difficult or impossible to distinguish between the effects of different contaminants.

The present invention is predicated on the fact that a very marked change in ionization current is obtained whenever the gaseous sample contains even minute traces of particulate matter on the order of sub-micron size. Accordingly, by reacting the constituent to be detected, or its products of pyrolysis, hydrolysis, photo decomposition, etc., with a suitable reagent in the ionization chamber to form such particulate matter, it is possible to obtain extremely high sensitivity and also specificity to families of gases and vapors. In many cases, as where the contaminant, if present, is known, high sensitivity alone is equivalent to high specificity. For example, hydrogen halides and organic acid vapors can be detected directly in parts per billion by using anhydrous ammonia as the reagent; and, conversely, ammonia, hydrogen cyanide, and many amines can be detected directly by using acetic acid vapor or anhydrous hydrogen chloride as the reagent. In addition, halogenated hydrocarbons, such as carbon tetrachloride, trichloroethylene, and methylbromide, can be detected by pyrolyzing the gas sample just before it enters the ionization chamber.

The present invention will be described in connection with the attached drawings, in which Fig. 1 shows an improved ionization chamber for use in practicing the present invention;

Fig. 2 is a schematic diagram of the ionization chamber of Fig. 1 connected as a detector chamber in an electrical circuit for measuring changes in the ionization current;

Fig. 3 is a schematic diagram similar to Fig. 2, but including two ionization chambers, one acting as a detector and the other as a compensator, the chambers being connected for parallel gas flow therethrough;

Fig. 4 is similar to Fig. 3, except that the two chambers are arranged for series gas flow therethrough.

Referring to Fig. 1 the ionization chamber, generally indicated by the numeral 1, includes an outer electrode 2 in the form of a cylindrical tube, which may be made of stainless steel or other suitable conducting material. One end of this electrode is partially closed by a closure member 3, which may be made of insulating or conductive material. The closure member is provided with an inlet passage 4 for introducing the gas sample and a reagent passage 5 for introducing a reagent gas. It has been found convenient to taper a portion of the inner wall 6 of this closure member and to have the passages 4 and 5 enter the chamber at an angle to the chamber axis, as shown in the drawing, to permit mixing the sample and reagent gases. However, it will be apparent that other geometrical arrangements can be used, including a separate mixing space in the ionization chamber for constituent-reagent reactions that are relatively slow. In cases where the reagent used is not a gas, passage 5 can be omitted; and the reagent can be suitably supported adjacent to the inlet 4 so that the gas sample may contact the reagent.

The other end of outer electrode 2 is provided with a second closure member 7, which contains an outlet passage 8 that may be connected to a pump (not shown) for drawing the gas sample through the ionization chamber. Closure member 7 is also provided with an insulated well 9, having a closed end 10 remote from the chamber. The well may be made of any suitable non-conductor, preferably treated with a hydrophobic compound that will minimize the surface adsorption of moisture. In some cases, it may be desirable to provide a heating element around the well, which is then preferably made of glass. On this closed end of the well, or adjacent thereto, is mounted an inner electrode 11 in the form of a wire with its active portion 12 lying on the axis of the outer electrode 2. The foregoing means of supporting the inner electrode avoids the formation of low resistance leakage paths between the two electrodes due to condensation or adsorption of moisture within the chamber.

The ionizing source 15 of alpha particles may consist of a small amount of radium distributed within the chamber, as, for example, on the inside surface of the outer electrode.

Fig. 2 shows a schematic flow diagram and circuit arrangement of a detection system using the ionization chamber described above as a detector chamber 20. Connected to the sample inlet 4 of the detector chamber is a pyrolyzer 21, with a resistance heater 22 that can be connected to a suitable source of electric current (not shown). The pyrolyzer can be used or not, as desired; but is often useful in breaking down certain contaminants, such as halogenated hydrocarbons, to obtain products that will react with specific reagents in the detector chamber. The electrical circuit includes the chamber 20, and a fixed resistor 23 of substantially equivalent resistance, as series arms of a Wheatstone bridge. A potentiometer rheostat 24 provides the other two arms and permits zero adjustment of the bridge. A suitable voltage is applied to the bridge by a battery 25, which is connected through a switch 26 to bridge terminals 27 and 28. Bridge balance or unbalance is measured by a conventional cathode follower electrometer circuit, generally designated by the symbol V, which includes a very high impedance voltmeter M, and this circuit is connected across the bridge, between bridge terminal 29 and the potentiometer rheostat slider 30, as shown in the drawing. When the bridge is initially balanced with an uncontaminated gas, for example, pure air, and then a contaminant is added to the air, there will be a sharp decrease in the ionization current in the detector chamber 20 provided that the contaminant reacts in that chamber with a reagent to form particulate matter. This change in ionization current is translated into a voltage difference in the bridge, causing a bridge unbalance that can be measured directly by the meter M, or by the required adjustment of the potentiometer rheostat slider 30 to bring the bridge in balance. The entire system is very sensitive and specific, responding only to gaseous constituents that react with a specific reagent to produce particulate matter.

It is frequently desirable to provide a second or compensator ionization chamber to neutralize background materials in the gas sample, as well as changes in gas pressure, temperature, rate of flow, etc., that might otherwise give erroneous readings. Such a compensator chamber 35 is shown in Fig. 3, and is preferably identical in structure and dimensions to the detector chamber already described, except that the compensator chamber is not provided with a passage 5 for introducing a reagent. As shown in Fig. 3, the gas sample first passes through the pyrolyzer 21 and then is evenly divided for parallel flow through detector chamber 20 and compensator chamber 35, a reagent being added only in the detector chamber. In the electrical circuit, the compensator chamber 35 is substituted for the fixed resistor 23 in the circuit of Fig. 2, without any other change. Accordingly, the other details of that circuit have not been repeated in Fig. 3. If the two chambers are dimensionally and electrically equivalent, they respond equally to background materials and changes of pressure, temperature, etc., of the sample atmosphere and a difference in conductivities between the chambers is observed only when a constituent of the sample reacts with the reagent in the detector chamber to form particulate matter.

In many cases, it is convenient and desirable to arrange the detector and compensator chambers for series gas flow, the sample first passing through the compensator chamber and then through the detector chamber, a reagent being present only in the latter. Such an arrangement of the two ionization chambers, as shown in Fig. 4, permits of simplified construction, with the outer electrodes in axial alignment and separated by the insulator ring 31, on which are mounted the well 9 and the common inner electrode 12, as well as the reagent passage 5. Again, the electrical circuit is identical with that in Fig. 2, except for the substitution of the compensator chamber 35 for the fixed resistor 23.

Applicants have had satisfactory results in using an ionization chamber with an outer electrode about 10 cm. long by 2 cm. in diameter, and with an alpha source consisting of 50 to 100 micrograms of radium distributed on the inner surface of the electrode. For a chamber of such dimensions, a bridge voltage of 22½ to 45 volts, with a null indicator span of 2 to 20 volts full scale, gives a full range of instrument sensitivities. Increasing the voltage across the chambers causes a proportional increase in the noise level, but a less than proportional increase in signal strength. This indicates that the detector chamber is most sensitive where its current-voltage curve is steepest and nearly linear.

It has been found that the number of ions formed within the ionization chamber is substantially independent of the rate of gas flow therein, and that only the long lived ions, or those formed near the gas outlet, are swept out of the chamber. Accordingly, the ionization current in the chamber is reduced only slightly when the rate of gas flow is increased. For the chamber described here, sensitivity increases with increasing flow between 2 and 10 litres/min., without appreciable increase in the noise level. As discussed more fully below, it is believed that such increase in sensitivity is due to the fact that this apparatus is most sensitive where the reaction particles are as small and numerous as possible when subjected to the electrical field inside the chamber, and that with a higher flow rate these particles probably do not have time to merge into fewer and larger ones, as by agglomeration. In most cases, a flow rate of 4 to 5 litres/min. is entirely satisfactory. Of course, there must be sufficient reagent present in the chamber to insure a high particle yield when dealing with low concentrations of a contaminant in a gas sample. For example, in detecting hydrogen chloride from pyrolyzed carbon tetrachloride with the apparatus arranged as in Fig. 3, optimum sensitivity was obtained by admitting the gas sample into the chamber at a flow rate of 5 litres/min. and admitting anhydrous ammonia as a reagent at a rate of 200 cc./min. Increasing the flow of reagent, without increasing the flow of the sample, tended to dilute the sample.

It has been found that when the detecting system is arranged in accordance with Fig. 4, i.e., for series flow of the gas sample, sensitivity to hydrogen chloride and hydrogen fluoride is lost. When air containing a high concentration of hydrogen chloride was passed through and ionized in the compensator chamber and subsequently reacted with ammonia in the detector chamber, the detector ionization current, instead of dropping sharply as would be expected from tests using the parallel flow arrangement of Fig. 3, gave only small and erratic signals. The only material difference that exists between the series and parallel flow arrangements is that in the former, but not in the latter, the mixture is preionized in the compensator chamber before it is reacted with a reagent and ionized in the detector chamber. Conversely, however, preionization of ammonia as a contaminant in the compensator chamber and its subsequent reaction with hydrogen chloride in the detector chamber produced a sharp drop in the ionization current in the latter chamber, similar to that produced with the parallel gas flow arrangement of Fig. 3. Apparently, for some reason, the preionization of hydrogen chloride or hydrogen fluoride, but not the preionization of ammonia, affects in some way either its subsequent reaction with a particle forming reagent, or affects the particles formed in that reaction, so that detectable particles are not present in the detector chamber. It has been found, however, that detectable particulate matter is always formed in accordance with expected chemical reactions where the sample is not ionized before it is reacted in the chamber with the reagent. It was also found that whenever detectable particulate matter is formed, there is a drop in the detector ionization current, regardless of the series or parallel arrangement of the two chambers.

Applicants are familiar with Meili Patent No. 2,702,898, disclosing the use of an ionization chamber for detecting particles of smoke generated by combustion at a distance from the chamber and introduced therein by diffusion. Meili explains (column 2, lines 25–30) that the drop in ionization current in his ionization chamber is due primarily to the absorption of alpha particles by the particles of smoke. After careful investigation, applicants have found that the phenomenon of alpha particle absorption does not occur in the present invention to any measurable extent. The calculated cross-sectional area of the particulate matter formed in accordance with the present invention, for example, by reacting known concentrations of hydrogen chloride with ammonia is entirely inadequate to explain the observed decrease in ionization current on the basis of absorption of alpha particles. This conclusion was verified by the following experiment. The alpha source was removed from the ionization chamber but placed near the inlet of that chamber, so that alpha particles could enter the chamber and produce a measurable ionization current with pure air as the sample gas. When known concentrations of hydrogen chloride and ammonia were then reacted to form particulate matter, and this was passed between the alpha source and the inlet of the ionization chamber, but without permitting these gases or their reaction particles to enter that chamber, the ionization current remained unchanged. However, when these gases were allowed to react in the chamber, the ionization current dropped immediately. In addition, it is known from Milikan's oil drop experiment that individual drops in an ionized gas can acquire several electronic charges, and that spontaneous changes, including reversals of charge, occur quite readily. Accordingly, it appears that the presence in an ionization chamber of particulate matter, formed by the reaction of a gas or vapor with a specific reagent, does not result in any appreciable absorption of alpha particles, but has a two-fold effect: (1) it increases the recombination coefficient, R, possibly acting as a third body in a three-body collision and (2) it decreases the mobility of the ions in the chamber atmosphere. Each of those effects tends to reduce the ionization current.

Not only does Meili's ionization chamber operate on a different physical principle from applicants' chamber, but also Meili's chamber itself is not suitable for use in the present invention. As previously pointed out, the operation of Meili's chamber is predicated on the generation of smoke particles at a point remote from the chamber and the subsequent introduction of those particles into the chamber. In accordance with this teaching, applicants generated particulate matter outside of the ionization chamber by reacting a high concentration of hydrogen chloride in air with ammonia. The reaction was carried out in a jug, and the air therein and the entrained particles were promptly drawn through the detector ionization chamber. There resulted only a very slight reduction in the ionization current on the order of one-tenth of that obtained when these same compounds were reacted inside the chamber itself in accordance with the present invention. When the concentration of hydrogen chloride in the jug was reduced to parts per billion and reacted with ammonia, the resulting particulate matter when introduced into the chamber produced no measurable drop in ionization current, although the drop was quite marked when the same reaction occurred in the chamber itself. Accordingly, in testing for contaminants such as hydrogen chloride, which react very quickly with ammonia as a reagent, it is necessary that the reaction be carried out in the ionization chamber immediately before or during the ionization of the involved gases, in order to obtain sufficient sensitivity to detect the presence of trace amounts of hydrogen chloride. If the reaction is carried out just outside of the chamber, there is only negligible response, and if the reaction is carried out at a point well removed from the ionization chamber (as contemplated by Meili), there would be no response at all.

A number of vapor phase reactions have been studied in connection with various applications of the present invention. Among those that use anhydrous ammonia as the reagent is the detection of hydrogen halides, HX, according to the reaction, $$HX + NH_3 \rightarrow NH_4X$$

the detection of nitric oxide, according to the reaction, $$NO \xrightarrow{air} NO_2$$

$$NO_2 + NH_3 + H_2O \rightarrow NH_4NO_2 + NH_4NO_3$$

the detection of sulfur dioxide, according to the reaction, $$SO_2 + NH_3 \xrightarrow{air} (NH_4)_2SO_3$$

and the detection of halogenated hydrocarbons by pyrolysis to yield a hydrogen halide (plus $CO_2$ and $H_2O$), and the subsequent testing for the hydrogen halide by the ammonia reaction given above.

Likewise, among the reactions in which hydrogen chloride may be used as the reagent, is the detection of ammonia, according to the reaction, $$NH_3 + HCl \rightarrow NH_4Cl$$

and the detection of hydrogen cyanide, according to the reaction, $$HCN + HCl \xrightarrow{air} \text{particulate matter}$$

In some cases, acetic acid is preferable to hydrogen chloride as a reagent since it produces no fuming with moisture in the gas sample and so decreases the noise level of the detector.

It will be understood that other contaminants in air, or other constituents of gaseous mixtures, can be simply and accurately detected with a suitable reagent that reacts with the contaminant or constituent to produce particulate matter in an ionization chamber and thereby causing a decrease in ionization current.

The principles of the present invention can also be applied inversely, where the substance to be detected does not readily form particulate matter with a reagent, but can be used to prevent particle formation or to annihilate the particles after they are formed, thereby producing an increase in the ionization current over that obtained when particles are present. One example is detecting the presence of sodium hydroxide vapor as a contaminant in air. Under normal conditions, where the air sample is pure, if hydrogen chloride is added to the sample before it is introduced into the chamber and it is reacted with ammonia in the chamber to produce ammonium chloride particles, there will be a steady (though low) ionization current. Then any sodium hydroxide vapor that may be introduced into the sample as a contaminant will neutralize some or all of the hydrogen chloride vapor, before the latter combines with the ammonia, resulting in a reduction (or complete cessation) of particle formation and, therefore, increasing the ionization current over the previous steady rate. Other examples of such inverse operation will be apparent. In detecting contaminants by this inverse procedure, if a compensator chamber is used, it should be provided with means to expose the sample to the same reagent that is used in the detector chamber.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An ionization chamber for use in detecting minute quantities of a constituent gas or vapor in a gaseous mixture and in measuring the concentration of such constituent, comprising an outer electrode in the form of a hollow cylinder, a closure member at one end of the electrode provided with an inlet passage for the mixture, a second closure member at the other end of the electrode provided with an outlet passage for the mixture, an insulated well communicating with the chamber and having a closed end remote from the chamber, an inner electrode supported from the well and having an active portion coaxial with the outer electrode, and a source of ionization within the chamber for ionizing the mixture.

2. An ionization chamber in accordance with claim 1 that also includes means adjacent the inlet passage for contacting the gaseous mixture with a reagent that will react with the constituent to be detected to form nascent particulate matter.

3. An ionization chamber in accordance with claim 2, in which said means includes an inlet port in the first closure member for introducing a reagent gas.

4. An ionization chamber in accordance with claim 1, in which the insulated well is supported by the second closure member.

5. An ionization chamber in accordance with claim 1 that includes means for reacting the constituent to be detected in the mixture with a reagent gas to form nascent particulate matter in the chamber, said means comprising an inlet port adjacent the inlet passage for introducing the reagent gas and a mixing chamber for reacting the reagent with the constituent before the gaseous mixture is ionized in the chamber.

6. Apparatus for detecting a trace constituent of a gaseous mixture for use with an ionization chamber through which the mixture is passed and ionized in the presence of an electrical field to produce an ionization current; said apparatus comprising means for exposing the mixture as it enters the chamber to a specific reagent that will react with the constituent to be detected to form nascent particulate matter; and means for measuring the ionization current in the chamber before and after the mixture is exposed to the reagent.

7. Apparatus for detecting minute quantities of a constituent in a gaseous mixture, comprising a detector ionization chamber, a compensator ionization chamber; means for passing substantially equal amounts of the gaseous mixture simultaneously through each chamber, means in the detector chamber alone for exposing the mixture before it is ionized in that chamber to a specific reagent that will react with the constituent to be detected to form nascent particulate matter, means for applying equal electrical fields in each chamber to produce an ionization current; and means for measuring the difference between the ionization currents produced in the two chambers.

8. Apparatus in accordance with claim 7, containing the following additional element, means for pyrolizing the constituent of the gaseous mixture before it is introduced into each of the ionization chambers.

9. Apparatus for detecting minute quantities of gas or vapor in a gaseous mixture, comprising a detector ionization chamber, a compensator ionization chamber, means for conducting the gaseous mixture first through the compensator chamber and then through the detector chamber, means for adding to the gaseous mixture as it enters the detector chamber a specific reagent that will react with the constituent to be detected to form nascent particulate matter, means for applying to each chamber an equal electrical field to produce an ionization current in each chamber, and means for measuring the difference between the ionization currents produced in the two chambers.

10. Apparatus in accordance with claim 9, in which the following element is added, means for pyrolizing the constituent of the gaseous mixture before it enters the compensator chamber.

11. The method of detecting a trace constituent in the form of vapor or gas in a gaseous mixture that includes the following steps: exposing a stream of the mixture to a specific reagent for a sufficient interval to enable the reagent to react with the constituent to form nascent particulate matter that will be entrained in the mixture stream, immediately thereafter subjecting the mixture and the nascent particulate matter entrained therein to a source of ionization in the presence of an electrical field, measuring the resulting ionization current produced by the electrical field, and measuring the ionization current produced under the same ionizing and electrical field conditions by the mixture stream alone, whereby the difference between said measurements will indicate the presence and amount of the trace constituent.

12. The method of detecting minute quantities of a given constituent in a gaseous mixture that includes the following steps: exposing part of the mixture to an ionizing source while at the same time subjecting it to an electrical field of predetermined strength and measuring the resulting ionization current, exposing a second part of the mixture to a specific reagent for a sufficient interval to enable the reagent to react with the constituent that is to be detected to form nascent particulate matter, then exposing the second part of the mixture and the particulate matter therein to an equivalent ionizing source while subjecting it to an equivalent electrical field and measuring the resulting ionization current, whereby the decrease in the second measurement from the first measurement will indicate the presence and the amount of the constituent.

13. The method of detecting minute quantities of a constituent in a gaseous mixture that includes the following steps: dividing the mixture into substantially equal parts, exposing each of said parts separately to an equally effective source of ionization while at the same time subjecting each part to an electrical field of equal intensity thereby to produce substantially equal ionization currents in each of said parts, one of said parts immediately before it is exposed to the source of ionization being exposed to a specific reagent that will react with the constituent to be detected to form nascent particulate matter that will be entrained with the mixture, and measuring the difference in the ionization currents produced in each of said parts.

14. The method of detecting minute quantities of a constituent in a gaseous mixture that includes the following steps: passing part of the mixture through an ionization zone, passing a substantially equal part of the mixture through a second ionization zone immediately after adding to this part of the mixture a specific reagent that will combine with the constituent to be detected to form nascent particulate matter, each of said parts being exposed to substantially equally effective source of ionization in its respective zone, applying substantially equal electrical fields to the mixture in each of said zones, and measuring the resulting difference in ionization current produced in the two zones.

15. The method of detecting minute quantities of a constituent in a gaseous mixture that includes the following steps: passing the mixture through a first ionization zone while subjecting it to an effective source of ionization and to an applied electrical field of given intensity to produce a measurable ionization current, then exposing the mixture leaving the first ionization zone to a specific reagent that will combine with the constituent to be detected to form nascent particulate matter entrained in the mixture, then passing the mixture while its entrained particulate matter remains nascent through a second ionization zone and there subjecting it to an equally effective source of ionization and to an equivalent applied electrical field, and measuring the difference in the ionization current produced in the two zones.

References Cited in the file of this patent

UNITED STATES PATENTS

| 2,408,051 | Donelian | Sept. 24, 1946 |
| 2,627,543 | Obermaier | Feb. 3, 1953 |
| 2,702,898 | Meili | Feb. 22, 1955 |
| 2,740,894 | Deisler et al. | Apr. 3, 1956 |
| 2,755,391 | Keyes | July 17, 1956 |
| 2,756,840 | Maas | July 31, 1956 |

FOREIGN PATENTS

| 657,548 | Great Britain | Sept. 19, 1951 |